(12) United States Patent
Kwon et al.

(10) Patent No.: US 8,848,687 B2
(45) Date of Patent: Sep. 30, 2014

(54) APPARATUS AND METHOD FOR TRANSCEIVING INFORMATION ON AN UPLINK TIMING GROUP IN A WIRELESS COMMUNICATION SYSTEM

(75) Inventors: Kibum Kwon, Seoul (KR); Myungcheul Jung, Seoul (KR); Eun Kyoung Ko, Seoul (KR)

(73) Assignee: Pantech Co., Ltd., Seoul (KR)

( * ) Notice: Subject to any disclaimer, the term of this patent is extended or adjusted under 35 U.S.C. 154(b) by 160 days.

(21) Appl. No.: 13/641,051

(22) PCT Filed: Apr. 12, 2011

(86) PCT No.: PCT/KR2011/002600
§ 371 (c)(1),
(2), (4) Date: Oct. 12, 2012

(87) PCT Pub. No.: WO2011/129601
PCT Pub. Date: Oct. 20, 2011

(65) Prior Publication Data
US 2013/0034087 A1 Feb. 7, 2013

(30) Foreign Application Priority Data
Apr. 12, 2010 (KR) ........................ 10-2010-0033219

(51) Int. Cl.
*H04J 3/06* (2006.01)
(52) U.S. Cl.
USPC ........................................................ 370/350

(58) Field of Classification Search
USPC ......................................... 370/328–350, 503
See application file for complete search history.

(56) References Cited

U.S. PATENT DOCUMENTS

| 8,391,129 B2* | 3/2013 | Dinan ............................ 370/206 |
| 2004/0081073 A1 | 4/2004 | Walton et al. |
| 2012/0250520 A1* | 10/2012 | Chen et al. ..................... 370/241 |

FOREIGN PATENT DOCUMENTS

| KR | 10-2005-0070085 | 7/2005 |
| KR | 10-2009-0009901 | 1/2009 |
| WO | 2007-127800 | 11/2007 |

OTHER PUBLICATIONS

International Search Report dated Dec. 19, 2011 issued for PCT/KR2011/002600.
Written Opinion dated Dec. 19, 2011 issued for PCT/KR2011/002600.

* cited by examiner

*Primary Examiner* — Frank Duong
(74) *Attorney, Agent, or Firm* — H.C. Park & Associates, PLC

(57) ABSTRACT

A method for transmitting information on an uplink timing group includes performing RACH procedures with user equipment for a preset period of time to generate an uplink timing group, and transmitting, to the user equipment, a message including information on the configuration of the thus-generated uplink timing group, wherein said uplink timing group is a group of one or more component carriers to which identical uplink timing correction is applied.

26 Claims, 10 Drawing Sheets

APPARATUS AND METHOD FOR TRANSCEIVING INFORMATION ON AN UPLINK TIMING GROUP IN A WIRELESS COMMUNICATION SYSTEM

CROSS-REFERENCE TO RELATED APPLICATIONS

This application is the National Stage Entry of International Application No. PCT/KR2011/002600, filed on Apr. 12, 2011 and claims priority from and the benefit of Korean Patent Application No. 10-2010-0033219, filed on Apr. 12, 2010, all of which are hereby incorporated by reference for all purposes as if fully set forth herein.

BACKGROUND

1. Field

The present invention relates to a method and apparatus for configuring an uplink synchronization group in a wireless communication system, and more particularly, to a method and apparatus for transceiving information associated with a timing group so as to provide an uplink timing associated with one or more component carriers.

2. Discussion of the Background

Synchronization between a user equipment and an evolved Node-B is an important issue in a wireless communication system since exchange of information between the user equipment and the evolved Node-B may be abnormally performed without synchronization.

A current wireless communication system attempts to satisfy a user demand through use of a plurality of component carriers and thus, a wireless communication system that supports a plurality of component carriers has been discussed. However, a detailed scheme for synchronization with respect to the plurality of component carriers has not been provided yet.

Synchronization is a factor that has a great effect on an efficiency of a network. Accordingly, there is a desire for a method for effective synchronization in a wireless communication including a plurality of component carriers.

SUMMARY

Therefore, the present invention has been made in view of the above-mentioned problems, and an aspect of the present invention is to provide a method and apparatus for effectively setting an uplink synchronization in a wireless communication network environment that operates a plurality of component carriers.

Another aspect of the present invention is to provide a method and apparatus for configuring a synchronization group associated with a plurality of component carriers in a wireless communication system.

Another aspect of the present invention is to provide a method and a user is equipment for configuring an uplink timing synchronization group associated with a plurality of component carriers in a wireless communication system.

Another aspect of the present invention is to provide a method and apparatus for generating uplink synchronization information required for setting synchronization in a wireless communication system.

Another aspect of the present invention is to provide a method and a user equipment that requests configuration of an uplink timing synchronization group associated with a plurality of component carriers in a wireless communication system.

Another aspect of the present invention is to provide a method and a transceiving apparatus that configures an uplink timing synchronization group associated with a plurality of component carriers and performs transceiving of the uplink timing synchronization group with respect to a user equipment in a wireless communication system.

Another aspect of the present invention is to provide a method and apparatus for generating a message requesting configuration of an uplink timing synchronization in a wireless communication system.

Another aspect of the present invention is to provide a method and apparatus for generating a message including uplink timing synchronization configuration information in a wireless communication system.

In accordance with an aspect of the present invention, there is provided a method of transmitting information associated with an uplink timing group, the method including: receiving, by an evolved Node-B from a user equipment, a message requesting configuration of an uplink timing group; performing random access (RACH) with the user equipment during a predetermined period of time, so as to generate an uplink timing group; and transmitting, to the user equipment, a message including information associated with a configuration associated with the generated uplink timing group, and the uplink timing group corresponds to a set of one or more component carriers to which identical uplink timing advance is applied.

In accordance with another aspect of the present invention, there is provided a method of receiving information associated with an uplink timing group, the method including: transmitting, by a user equipment to an evolved Node-B, a message requesting configuration of an uplink timing group; performing random access (RACH) with the evolved Node-B during a predetermined period of time; receiving information associated with a configuration of an uplink timing group from the evolved Node-B; and performing uplink timing advance in accordance with a corresponding uplink timing group based on the received information associated with the configuration of the uplink timing group, and the uplink timing group corresponds to a set of one or more component carriers to which identical uplink timing advance is applied.

In accordance with another aspect of the present invention, there is provided an apparatus for transmitting information associated with an uplink timing group, the apparatus including: a transceiving unit to receive, from a user equipment a message requesting configuration of an uplink timing group; an uplink timing group configuring unit to generate an uplink timing group by performing random access (RACH) with the user equipment during a predetermined period of time; and a controller to control the transceiving unit to transmit a message including information associated with a configuration of the generated uplink timing group to the user equipment, and the uplink timing group corresponds to a set of one or more component carriers to which identical uplink timing advance is applied.

In accordance with another aspect of the present invention, there is provided an apparatus for receiving information associated with an uplink timing group, the apparatus including: a transceiving unit to transmit, to an evolved Node-B, a message requesting configuration of an uplink timing group; and a controller to perform random access (RACH) with the evolved Node-B during a predetermined period of time, and the transceiving unit receives information associated with a configuration of an uplink timing group from the evolved Node-B, the controller performs uplink TA in accordance with a corresponding uplink timing group based on information associated with the received information associated with the configuration of the uplink timing group, and the uplink timing group corresponds to a set of one or more component carriers to which identical uplink timing advance is applied.

DETAILED DESCRIPTION OF THE ILLUSTRATED EMBODIMENTS

Figure 1:
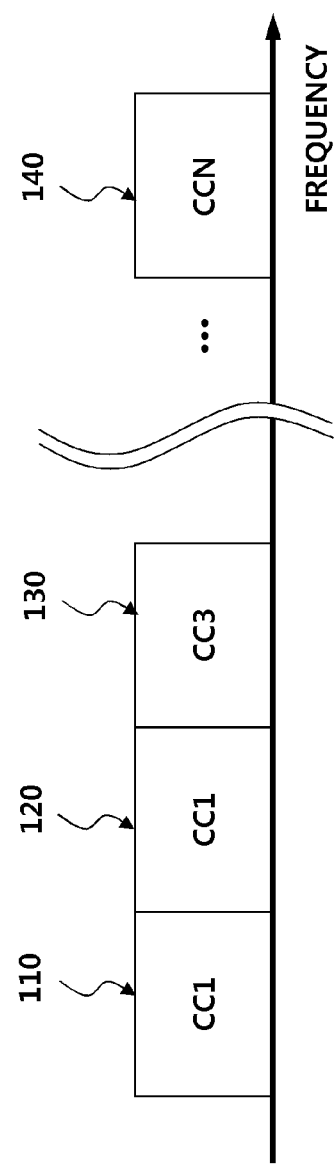
FIG. 1 is a diagram illustrating an example of configuring a plurality of component carriers.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The specifications will describe a wireless communication system as an example, and operations performed in wireless communication may include all operations performed in a system that manages the wireless communication network and a wireless communication device that performs data transmission with the system, and the like. The wireless communication system may provide various communication services such as voice data, packet data, and the like.

The wireless communication system may be configured to include a user equipment (UE) and an evolved Node-B (eNB). The user equipment may be an inclusive concept indicating a user terminal utilized in a wireless communication, including a UE in wideband code division multiple access (WCDMA), Long Term Evolution (LTE), high speed packet access (HSPA), and the like, and a mobile station (MS), a user terminal (UT), a subscriber station (SS), a wireless device and the like in global system for mobile communications (GSM).

The eNB or a cell may refer to a station where communication with the user is equipment is performed, and may also be referred to as a Node-B, a base transceiver system (BTS), an access point, and the like. The eNB may be construed as an inclusive concept indicating a portion of an area covered by a base station controller (BSC) in CDMA, a radio network controller (RNC) in WCDMA, and the like, and the cell may be construed as an inclusive concept including various cell coverage areas, such as a megacell, macrocell, a microcell, a picocell, a femtocell, and the like.

In the specifications, the UE and the eNB are used as two inclusive transceiving subjects to embody the technology and technical concepts described in the specifications, and may not be limited to a predetermined term or word.

Also, the wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. Here, uplink transmission and downlink transmission may be performed based on a time division duplex (TDD) scheme that performs transmission based on different times, or based on a frequency division duplex (FDD) scheme that performs transmission based on different frequencies.

FIG. 1 is a diagram illustrating an example of a wireless communication system that uses a plurality to CCs according to an embodiment of the present invention.

Referring to FIG. 1, the wireless communication system may be a next generation communication system, for example, an LTE/LTE-A system. The LTE/LTE-A system may be used for extending a bandwidth to satisfy a high data transmission rate corresponding to a system requirement, and may use a plurality of component carriers which are unit carriers (hereinafter a component carrier is referred to as a 'CC').

Here, a single CC may have a maximum bandwidth of 20 MHz. Resource allocation may be performed within a bandwidth of 20 MHz depending on a corresponding service. Depending on a configuration of a system, a single CC may be configured to have a bandwidth greater than or equal to 20 MHZ. Also, a plurality of CCs may be bound and used as a single system band, and may be referred to as a carrier aggregation (hereinafter referred to as a 'CA').

Throughout the specifications, each CC may be distinguished by names, for example, CC0, CC1, and the like. However, a number included in a name of each CC may not always match an order of a corresponding CC or a location of a frequency band of the corresponding CC, and each CC may be set or adjusted based on arrangement between the eNB and the UE. Also, the CC may be defined to be a concept including a downlink CC (DL CC) or including both the DL CC and an uplink CC (UL CC), or may be defined to be a cell or a serving cell.

In other words, the cell may be defined by only DL frequency resources (CC) is through which a wireless signal recognized by a UE reaches a predetermined area, and may be defined to be a pair of the DL frequency resources that may be used by the UE to receive a signal from the eNB and UL frequency resources that may be used by the UE to transmit a signal to the eNB. The eNB may configure a plurality of serving cells for the UE so as to transmit and receive data through a current wireless communication connection.

Referring to FIG. 1, when five CCs having a maximum bandwidth of 20 MHz, for example, a first CC (CC1) 110, a second CC (CC2) 120, a third CC (CC3) 130, . . . , and an $N^{th}$ CC (CCN) 140, are used, the wireless communication system may support a quality of service with a bandwidth expanded up to 100 MHz.

An allocable frequency band of each CC may be contiguous or non-contiguous based on a scheduling of the CA. Also, an uplink (UL) or a downlink (DL) allocated to each CC may be different from each other, or may be the same as one another based on a scheduler. The uplink may be referred to as a UL and the downlink may be referred to as a DL. Also, one or more CCs may be included in a single group. That is, one or more CCs may configure a single group, and a group including a single CC may also exist.

In a wireless communication environment, an electric wave may experience a propagation delay while the electric wave is transferred from a transmitter to a receiver. Although both the transmitter and the receiver are accurately aware of a time when the electric wave is transmitted from the transmitter, a time when the electric wave is received by the is receiver may be affected by a distance between the transmitter and the receiver, an ambient propagation environment, and the like, and may vary over time when the receiver moves. When the receiver is not accurately aware of a point in time when a signal transmitted from the transmitter is to be received, the receiver may fail to receive the signal, or may receive a signal distorted due to the propagation delay and may fail to perform communication.

Accordingly, in the wireless communication system, synchronization between the eNB and the UE may be established first to receive a signal. A synchronization process is an essentially important process in a communication system, and may also significantly affect a stability of the system and a quality of communication. There may be various types of synchronization, such as a frame synchronization, an information symbol synchronization, a sampling period synchronization, and the like. The sampling period synchronization may need to be obtained basically, so as to distinguish a physical signal.

Downlink synchronization may be obtained in the UE based on a signal of the eNB. The eNB may transmit a predetermined signal that is mutually prearranged, so that the UE may readily obtain downlink synchronization, and the UE may need to accurately distinguish a time when the predetermined signal is transmitted from the eNB. In a case of a downlink, a single eNB may simultaneously transmit a synchronization signal to a plurality of UEs and thus, each UE may independently obtain synchronization based on the synchronization signal.

Conversely, in a case of an uplink, the eNB may receive signals transmitted is from the plurality of UEs and thus, the eNB may have difficulty in obtaining synchronization based on one of the UEs. Accordingly, a synchronization process that is different from the downlink may be required. When distances between the UEs and the eNB are different from each other, the UEs may have different transmission delay times. When each UE transmits uplink information based on a corresponding downlink synchronization, information transmitted from each UE may be received by the eNB at different times.

Also, in a wireless communication system that is based on OFDMA or FDMA, uplink transmission information of all the UEs may be simultaneously received by the eNB and may be demodulated and thus, a reception performance may be rapidly deteriorated as a reception time difference of each UE signal received in the eNB is increased. Accordingly, in a wireless communication system that utilizes OFDMA or SC-FDMA, such as LTE, may need a method that calculates a timing alignment value for each UE based on a random access scheme and the like, to obtain a transmission delay time in a DL and a transmission delay time in a UL, and that obtains an uplink synchronization based on the calculated timing alignment value.

Figure 2:
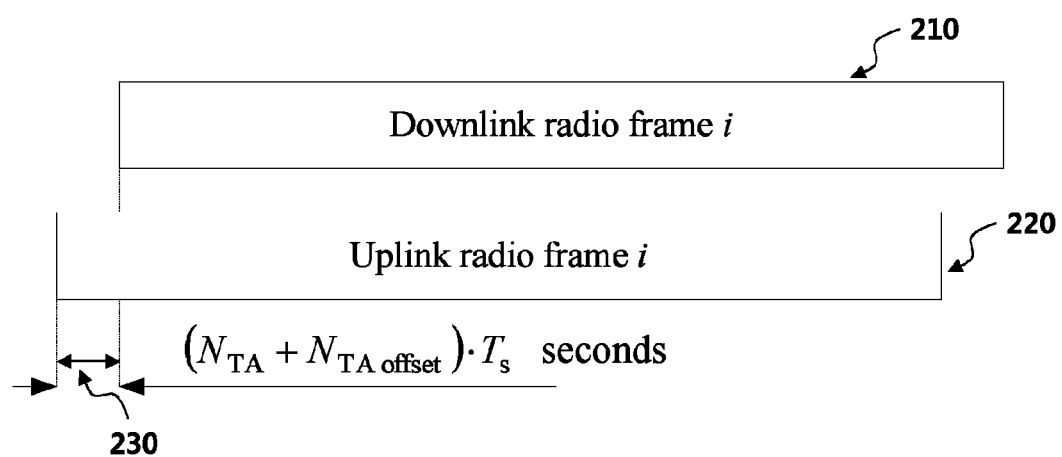
FIG. 2 is a diagram illustrating an example of timing advance (TA) in a synchronization process.

FIG. 2 is a diagram illustrating an example of a timing advance (hereinafter referred to as 'TA') in a synchronization process according to an embodiment of the present invention.

Referring to FIG. 2, TA is a scheme of enabling a UE to transmit an uplink radio frame i 220 a little earlier than a downlink frame i 210 by taking a propagation delay into consideration, so as to obtain synchronization between an eNB and the UE.

$$TA = (N_{TA} + N_{TA\ offset}) \cdot T_S \text{ seconds} \qquad \text{[Equation 1]}$$

Here, $N_{TA}$ denotes a variable value controlled based on TA command information from the eNB, and $N_{TAoffset}$ denotes a fixed value set based on a frame structure. $T_s$ denotes a period of sampling.

As shown in FIG. 2, to obtain an uplink synchronization, the UE may receive TA information provided by the eNB, and may proceed with TA based on the received TA information. Accordingly, synchronization for wireless communication with the eNB may be obtained.

Figure 3:
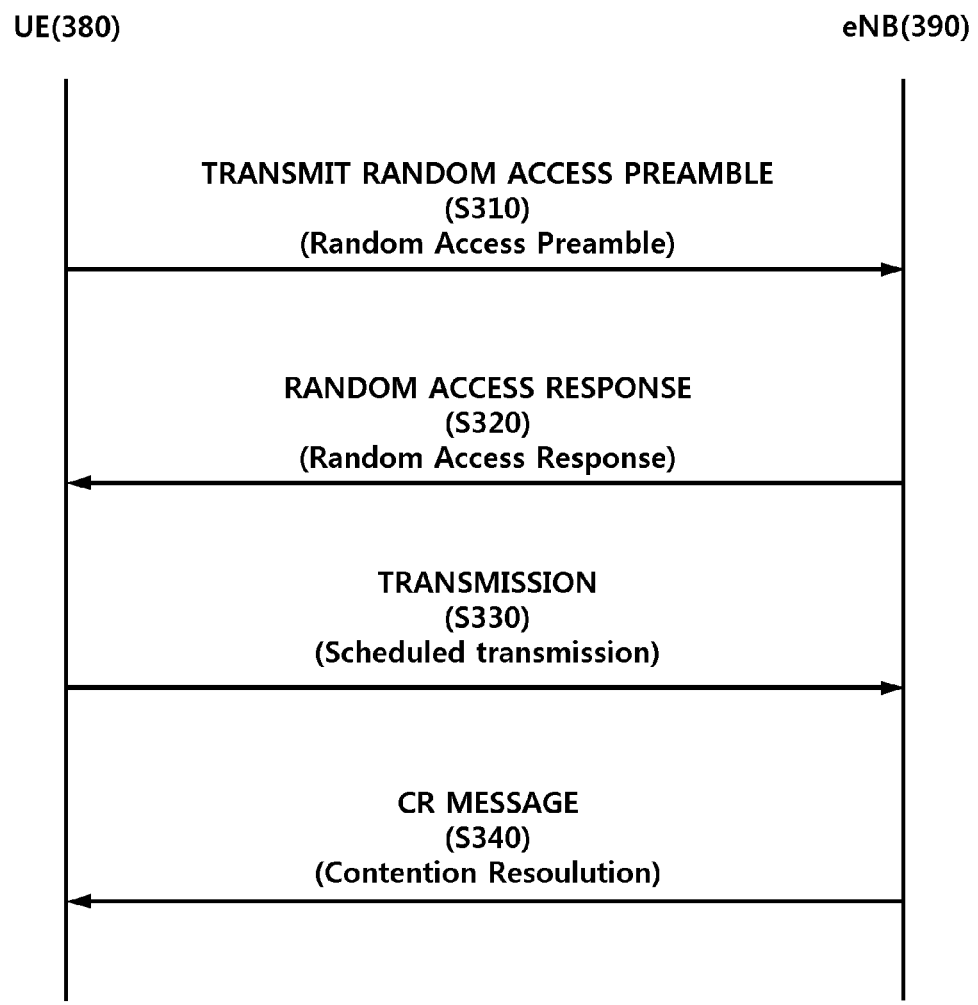
FIG. 3 is a diagram illustrating a random access procedure between a user equipment and an evolved Node-B.

FIG. 3 illustrates a random access procedure performed between a UE and an eNB according to an embodiment of the present invention.

Referring to FIG. 3, to perform transmission and reception of data with an eNB 390, a UE 380 may need to obtain an uplink synchronization. To obtain the uplink synchronization, the UE 380 may proceed with the random access procedure that performs transmission and reception of information required for synchronization, with the eNB 390. The random access procedure may be applicable when a UE is newly coupled to a network through a handover and the like. Also, upon completing the coupling, the UE may proceed with the random access procedure even under a circumstance such as synchronization, a mode change, for example, from a UE radio resource control_IDLE (UE RRC_IDLE) mode to a UE RRC_CONNECTED mode, and the like.

The UE 380 may randomly select a preamble signature so as to generate a random access preamble (RAP). Subsequently, the UE 380 may transmit the selected preamble to the eNB 390 (step S310). The process of selecting the preamble signature may be contention-based selection or contention-free selection. According to the contention-free selection, the eNB may inform the UE of a previously reserved random access preamble, and the UE may select a preamble selected based on received information and transmit the preamble to the eNB 390 (step S310). Accordingly, transmission and reception of a contention resolution (CR) message may not need to be performed.

The UE 380 may recognize random access-radio network temporary identifier (RA-RNTI) based on a transmission time and a frequency resource temporarily selected for selecting a preamble or for random access channel (RACH) transmission.

The eNB 390 may perform random access response (RAR) with respect to the preamble received from the UE. In this example, the eNB 390 may transmit an RAR message through a physical downlink shared channel (PDSCH). Information transmitted through the RAR message may include, for example, identification information of the UE preamble received by the eNB, an identifier (ID) of the eNB, a temporary cell radio network temporary identifier (C-RNTI), information associated with a time slot where the preamble is received, TA information, and the like.

The UE 380 may receive a TA corresponding to timing information for an uplink synchronization through the RAR message, and may perform the uplink synchronization with the eNB 390. The UE 380 may perform a scheduled transmission that transmits data at a scheduled time determined based on the TA information received in step S320 (step S330). In this example, the UE 380 may transmit synchronized data through a physical uplink shared channel (PUSCH), and may perform hybrid automatic repeat request (HARQ).

Examples of a message transmitted in step S330 may include a radio resource control (RRC) connection request, a tracking area update, a scheduling request, and the like. Also, one of the messages may include a temporary C-RNTI, a C-RNTI (if the UE already has one), UE identification information, and the like.

In steps S310 through 330, collision may occur and thus, the eNB 390 transmits a CR message (step S340). Accordingly, the UE 380 may i) determine whether a received message corresponds to the UE 380, and may transmit an acknowledgement (ACK) when the received message corresponds to the UE 380 or ii) may not transmit response data when the received message corresponds to another UE. Also, the UE 380 may not transmit the response data when the UE 380 misses downlink allocation or fails to decode the message. Also, the CR message may include a C-RNTI, UE identification information, and the like.

As described in the foregoing, in a wireless system that uses a plurality of CCs, TA values of the CCs may have a high probability of being different from each other when locations of center frequencies of the CCs are significantly distant from each other as shown in FIG. 1, when the CCs are supported by different devices in a network, or the like. Accordingly, when a synchronization obtaining scheme used for a single carrier is applied as is, the CCs may have difficulty in obtaining the uplink synchronization for the CCs. Also, when the UE transmits, based on the same uplink synchronization standard, information through CCs of which uplink synchronization standards are different from each other, a probability of transmission error may be significantly high, and a time and resources for restoring the error may be wasted. In this example, it is difficult to satisfy an uplink quality of service (QoS) for an application program required by a system.

The wireless communication that operates a plurality of CCs may have a different transmission delay time for each DL CC. Accordingly, when CCs or CCs having the same TA value are configured as a set, an uplink synchronization standard may be different for each CC set and thus, uplink performance may be deteriorated.

Therefore, according to embodiments of the present invention, in a wireless communication system that uses a plurality of CCs, a method may be provided in which the UE obtains an uplink synchronization of a corresponding CC or a group of CCs based on a type of each CC, a location of a center frequency, a network service type, and the like when CCs or groups including at least one CC have different uplink synchronization standards.

Figure 4:
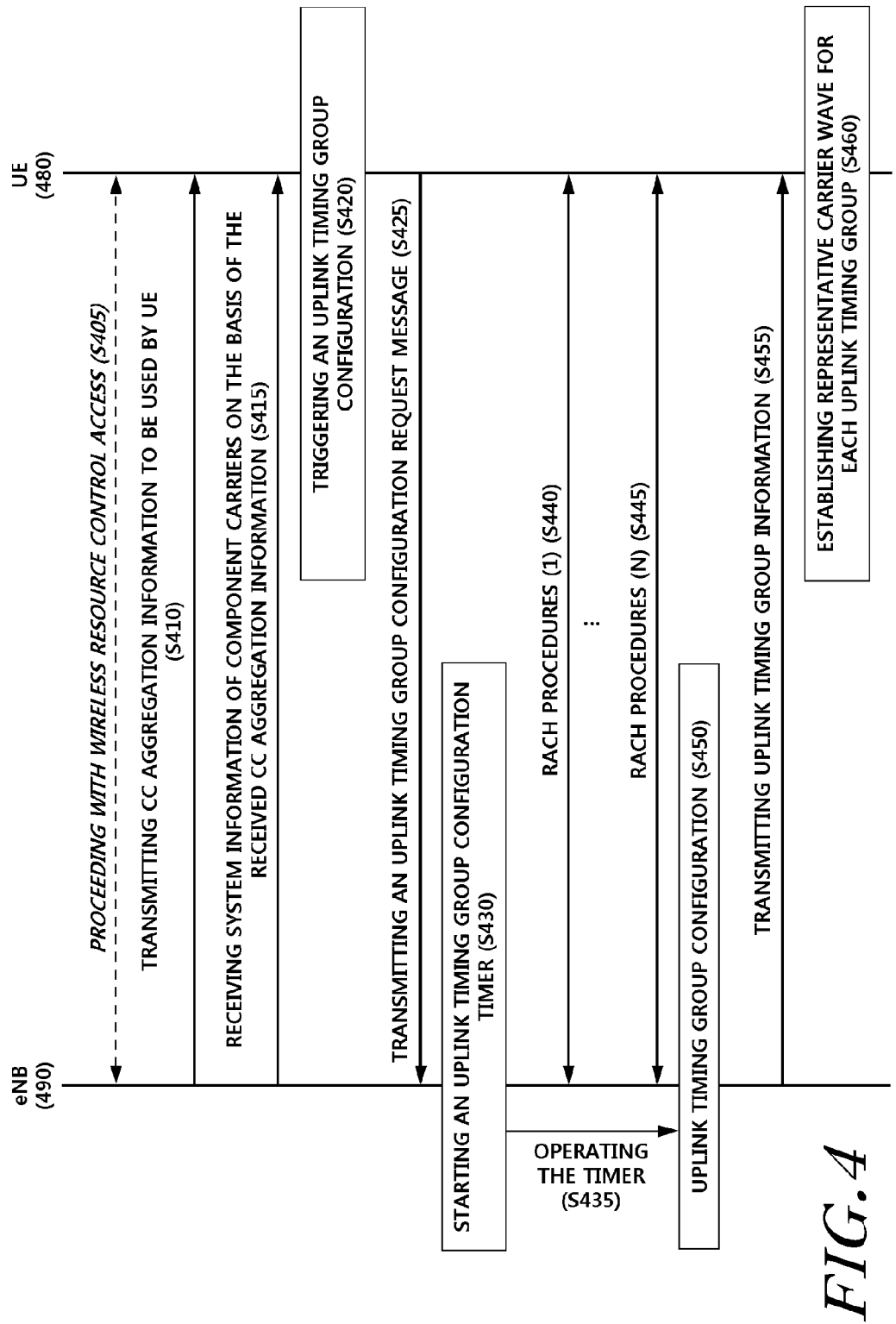
FIG. 4 is a diagram illustrating a process that configures an uplink timing group according to an embodiment of the present invention.

FIG. 4 is a diagram illustrating a process of configuring an uplink timing group according to an embodiment of the present invention. Embodiments of the present invention will describe a case in which an eNB configures an uplink timing group and a UE operates in an RRC connected mode, as an example. Also, the UE obtains a valid TA value associated with a primary component carrier (PCC) from among uplink component carriers.

The uplink timing group according to an embodiment of the present invention is configured by grouping at least one CC from among UL CCs into a predetermined group based on information required for an uplink synchronization such as a TA. Also, a predetermined CC from among the UL CCs may be set to be a delegate CC, and CCs included in the same uplink timing group may proceed with an uplink synchronization through the delegate CC. For example, synchronization information (TA value) obtained through the delegate CC may be applied to all CCs included in a corresponding group.

The PCC may be distinguished as an uplink PCC and a downlink PCC. Each of the UL PCC and the DL PCC may be set to be a UE-specific PCC. In addition to the PCC, a secondary component carrier (SCC) may exist. The PCC is always in an activation state in which the UE 480 is capable of receiving data. That is, when a CC is activated, a state of the UE 480 is changed into a state in which the UE 480 is capable of receiving data through a corresponding CC.

Hereinafter, a process of configuring the uplink timing group will be described.

The eNB 490 may transmit CC set information (CC Set Info) to the UE 480 through a DL PCC (step S410). When the UE is in an RRC IDLE mode or requires resetting, step S405 is performed first and then step S410 may be performed. In step S405, the eNB 490 may select at least one CC that is to perform RRC connection, and may configure CC set information so as to perform RRC connection (step S405).

The at least one CC to perform RRC connection may be selected based on the following information.

b-i) measurement information of the UE 480
b-ii) information fixedly set in a system and stored in an internal memory of the UE 480
b-iii) information transmitted to the UE 480 from the eNB 490 through system information
b-iv) system information of available CCs stored in an internal memory of the UE 480

For example, a UE in an IDLE mode may select a single downlink CC for the RRC connection based on the conditions, and may receive system information through a broadcasting channel that is transmitted through the selected CC.

Based on the received system information, the selected DL CC and an UL CC having a linkage with the DL CC may be the DL PCC and the UL PCC, respectively, and may be is configured as a primary serving cell (PCell). Here, the PCell may indicate a single serving cell that provides a security input and NAS mobility information in an RRC establishment state or re-establishment state. Also, based on the capabilities of the UE, at least one cell may be configured to form a serving cell set with the PCell, and the at least one cell may be referred to as the SCell. A CC corresponding to the SCell may be an SCC, and a DL SCC and a UL SCC corresponding to the DL SCC of the SCell may exist.

Accordingly, a serving cell set configured for a single UE may be configured of a single PCell or of a single PCell and at least one SCell. An adjacent cell in a frequency of the PCell and/or an adjacent cell in a frequency of the SCell may be in the same carrier frequency, and adjacent cells in frequencies of the PCell and the SCell may be in different carrier frequencies.

The UE may transmit an RRC connection request message to the eNB through the configured PCell. In this example, the UE may transfer the RRC connection request message to the eNB through the RACH procedure.

The PCell and the SCell may have characteristics as follows.

First, the PCell may be used for physical uplink control channel (PUCCH) transmission.

Second, the PCell is always activated, whereas the SCell is activated or deactivated based on a predetermined condition.

Third, when the PCell experiences radio link failure (RLF), RRC reconnection may be triggered. When the SCell experiences RLF, RRC reconnection may not be triggered.

Fourth, the PCell may be changed by a change of a security key or by a handover procedure accompanying the RACH procedure. In a case of a CR message, only a physical downlink control channel (PDCCH) indicating a CR may be transmitted through the PCell, and CR information may be transmitted through the PCell or the SCell.

Fifth, non-access stratum (NAS) information may be received through the PCell.

Sixth, the PCell may be configured as a pair of a DL PCC and a UL PCC.

Seventh, each UE sets a different CC as the PCell.

Eighth, a procedure such as, reconfiguration, adding, or removal of the SCell may be performed by an RRC layer. To add a new SCell, an RRC signaling may be used to transmit system information associated with a dedicated SCell.

Technical concept of the PCell and the SCell in embodiments of the present invention may not be limited to the descriptions provided in the foregoing, and may include further examples.

When RRC connection is completed through one of the above mentioned methods, the eNB 490 and the UE 480 may proceed with step S410. The CC set information transmitted in step S410 may include at least one piece of DL CC information and uplink CC information set for each UE. That is, the CC set information may be information associated with a CC assigned in a corresponding UE. The uplink CC set information may further include, for example, information associated with UL CCs having linkage with each DL, based on information associated with the DL CCs.

According to a method of transceiving the CC set information, the eNB 490 may include the CC set information in the RRC reconfiguration message for transmission to the UE 480, or may use other messages for transmission.

The eNB 490 may transmit system information (SI) associated with CCs in a CC set based on the set CC set information (step S415). In this example, SI associated with each CC may be received through a broadcasting channel of each downlink CC. The SI may include CC parameter information including a center frequency bandwidth of a predetermined CC, a number of antennas, and the like. When a PCC is included, SI associated with other CCs that are different from the PCC may be transmitted through an RRC message of the PCC. Also, the SI of other CCs that are different from the PCC may be transmitted through a broadcasting channel of the PCC.

The eNB 490 that transmits the CC set information and the SI may receive and determine an RACH transmitted from a UE. In this example, the eNB may store a TA value obtained through the RACH procedure with the UE in accordance with a UE identifier, such as a C-RNTI, a temporary C-RNTI (T-C-RNTI), and UE identity information of the UE that transmits the corresponding RACH.

Embodiments of the present invention will describe storing of a TA value in accordance with the UE identifier in the RACH procedure. However, the process of storing the TA value in accordance with the UE identifier may not be performed selectively, by a system based on a system operation. The RACH procedure may simultaneously, randomly, or selectively transmit an RAP through one or more CCs. The RAP may be transmitted through an SCC, as opposed to a PCC through which an uplink timing group configuration request message is transmitted.

The UE 490 that receives the CC set information and the SI may determine whether configuration of an uplink timing group is required, that is, whether a triggering for configuration of an uplink timing group occurs (step S420). In particular, the UE 490 may determine 1) whether an initial configuration of an uplink timing group is required or 2) whether updating of uplink timing group information is required, and may prepare to inform the eNB of the determined uplink timing group configuration triggering state (step S420).

A case in which the initial configuration of the uplink timing group is required may include a case that requires a TA value with respect to additionally configured CCs. For example, when configuration of additional uplink CCs is completed, the UE may immediately determine that a procedure of obtaining a TA value with respect to the configured uplink CCs is required. Here, configuration of the additional uplink CC may correspond to a case in which the UE configures an additional uplink CC in a state where only a PCC is included, a case in which is the UE configures an additional uplink CC in a state where at least one SCC is included in addition to the PCC, or a case in which at least one SCC is added in addition to the PCC.

When the UE determines that transmission of uplink data with respect to the additionally configured uplink CC is not required, it may be determined that obtaining of a TA value of the additionally configured uplink CC is not required. However, when a probability of transmission of data through a corresponding uplink CC exists, it is determined that obtaining of the TA value is required.

According to an embodiment of the present invention, cases that require obtaining of a TA value are as follows.

c-i) a case of a traffic having a high probability of a change in a transmission rate through a current uplink such as web surfing, file transmission, and the like c-ii) a case in which data transmission through an additional uplink CC is required since traffic is generated by a new application program and the like c-iii) a case in which a network desires to transmit data through an additional uplink CC due to a change in a wireless environment and the like although a probability of a change in a transmission rate is low For example, when a number of CCs that transmit data in an uplink increases since a resource allocation scheme with respect to the uplink CC is changed by a scheduler, the UE may determine that obtaining of a TA value of an additionally configured uplink CC is is required.

According to an embodiment of the present invention, cases that require updating of the uplink timing group information are as follows.

d-i) a case in which a response does not exist in response to uplink transmission data with respect to a few uplink CCs among CCs in a group of a UE d-ii) a case in which an eNB requests reconfiguration with respect to a few CCs in a group associated with a downlink synchronization d-iii) a case in which a CC time alignment timer set for each CC expires or a time alignment timer set for each UE expires d-iv) a case in which a downlink/uplink connection setup in an eNB is changed d-v) a case in which an uplink timing group is changed and a downlink/uplink connection setup in a group is changed d-vi) a case in which a UE performs a handover of a few CCs to an eNB that is physically different from the UE, a remote radio head (RRH), a relay, or the like Accordingly, the UE 490 may determine that it is a case that requires obtaining of an uplink synchronization with respect to the few CCs handed over during reconfiguration of an existing uplink timing group. Subsequently, the UE 480 may transmit, to the eNB 490, an uplink timing group configuration request message including a triggering cause value (step S425).

Also, the uplink timing group configuration request message may include indication information of 1 bit, which indicates whether the initial configuration of the uplink timing group is required or whether updating of the uplink timing group information is required, based on a result of determination associated with the triggering. The uplink timing group configuration request message including the indication information will be described in detail with reference to FIG. 7.

The UE may transmit the uplink timing group configuration request message to the eNB without the indication information. In this example, the eNB may recognize a circumstance of the corresponding UE when the corresponding UE transmits the uplink timing group configuration request message, without an indicator of 1 bit. When the eNB stores TA values associated with an uplink timing group for each UE, irrespective of a circumstance of the UE, the eNB may generate uplink timing group information based on the stored TA value and may transmit the uplink timing group information. In this example, therefore, the eNB may not need to receive the indicator information from the UE. Accordingly, the UE may transmit, to the eNB, an uplink timing group configuration request message excluding the indicator. The uplink timing group configuration request message may be transmitted to the eNB through an uplink PCC. The uplink timing group configuration request message may correspond to an RRC or an MAC message signaling.

The eNB 490 may receive the uplink timing group configuration request message is from the UE, and may operate an internally included timer (step S430 and step S435). The timer may be a timer for configuring an uplink timing group according to an embodiment of the present invention. A time value for operating the timer may be variably set based on a number of CCs configurable for the UE, or may be set to a fixed value by the eNB.

During a period where the timer operates, the RACH procedure may be performed between the UE 480 and the eNB 490 (step S440, . . . , and step S445). The eNB 490 may obtain a TA value through the RACH procedure. The RACH procedure will be described in detail.

The eNB 490 may start obtaining of a valid TA value associated with each uplink CC for the corresponding UE 480, after receiving the uplink timing group configuration request message (step S440, . . . , and step S445). That is, the eNB 490 may receive a selected random access preamble from the corresponding UE 480 in response to the received uplink timing group configuration request message, and may start obtaining of a valid TA value associated with each uplink CC through the received RAP. In this example, an RACH transmission scheme (simultaneous transmission, sequential transmission, random transmission, and the like) for the TA value obtaining procedure may be determined by the UE. The random transmission may randomly select a CC and may proceed with the RACH. The sequential transmission may sequentially perform the RACH in a predetermined order or in an order determined based on a characteristic of a CC. The simultaneously transmission may simultaneously perform the RACH with respect to CCs.

The RACH transmission scheme will be described in detail.

First, the simultaneous transmission will be described. When a UE determines that all configured uplink CCs are required for transmitting data in a current uplink, the UE may simultaneously transmit an RAP with respect to all delegate uplink CCs. Simultaneous transmission of the RACH may include a case in which a plurality of CCs transmits or receives signals in parallel, and also, may include a case in which transmission and reception may not completely match, but a unit of a time where transmission and reception are performed may match.

Conversely, when the UE determines that a few uplink CCs are required, the UE may simultaneously transmit an RAP with respect to groups where the few uplink CCs are included, through delegate uplink CCs, and may sequentially or randomly transmit an RAP of delegate uplink CCs with respect to remaining groups, so as to proceed with the TA value obtaining procedure. The TA may indicate a timing advance value that adjusts an uplink transmission time associated with a CC.

In particular, the UE receives, from the eNB, priority information of an uplink CC through which an RAP is to be transmitted, and may sequentially transmit the RAP based on the received priority information. The UE may receive reference information that sets a priority of an uplink CC through which an RAP is to be transmitted. In this example, the UE may is determine the priority of a delegate uplink CC through which an RAP is to be transmitted through use of SI of each uplink CC, based on the reference information.

The reference information used for setting the priority may be received as MAC control information. In this example, the MAC control information and the reference information setting the priority may be received through a PDCCH. Also, the reference information setting the priority may be received through an RRC message. The RRC message is received through a PDSCH. Here, the reference information may be, for example, a bandwidth (BW), an available RAP transmission time from a reference point, and an amount of available resources for RAP transmission, but it may not be limited thereto. Accordingly, the UE may apply the bandwidth to an SCC so as to set a priority, and may transmit an RAP. In this example, the UE may set a high priority for a PCC, irrespectively of the reference information, and thus, may transmit an RAP through a delegate CC in a group where the PCC is included.

When the reference information is prearranged between the UE and the eNB, the UE may determine a priority of a CC through which an RAP is to be transmitted, without a predetermined signaling. For example, when a number of SCCs through which the UE transmits an RAP is two or more, an RAP may be transmitted by putting a priority on a CC having a wide bandwidth.

Conversely, the UE may receive SI of each CC from the eNB, and may randomly is select a delegate uplink CC in a group so as to transmit an RAP, since the SI of each CC may include preamble (RAP) information for the RACH and information associated with time-frequency resources. Therefore, the UE may determine a preamble (RAP) associated with a delegate CC of each group and information associated with time-frequency resources, may select a predetermined preamble and time-frequency resources, and may perform RACH through a delegate uplink CC in the selected group.

Also, when the UE receives, from the eNB through a PDCCH, PDCCH order information indicating a random access procedure, the UE may determine downlink control information (DCI) in the PDCCH so as to determine an uplink CC through which an RAP is to be transmitted, RAP index information, and the like. In this example, the UE may transmit an RAP corresponding to the allocated RAP index, through the uplink CC indicated by the RACH information.

When the UE proceeds with a handover, the UE may use an RAP set by the eNB, may select a single uplink CC of which a TA value is to be obtained, irrespective of an existing uplink timing group, and may perform an initial TA value obtaining procedure. Here, the selected uplink CC may correspond to an uplink CC having a linkage with downlink CCs based on a channel quality or a signal strength of the downlink CCs between the UE and the eNB, which is measured by the UE. The UE may select the uplink CC based on mobility control information transmitted from the eNB or information included in an RRC reconfiguration is message.

The UE 480 may proceed with the RACH procedure with respect to uplink CCs that fail to obtain valid TA values, or may proceed with the RACH procedure with respect to all uplink CCs irrespectively of whether valid TA values are obtained. As described in the foregoing, the TA value obtaining procedure may be performed through the RACH procedure.

When all the valid TA values of uplink CCs with respect to the UE 480 that requests configuration of an uplink timing group are obtained within a predetermined time, the eNB 490 may generate uplink timing group configuration information based on the obtained valid TA values of the uplink CCs (step S450). In this example, the eNB 490 may store a UE identifier such as a C-RNTI, a T-C-RNTI, UE identity information determined while the RACH procedure is performed for each CC, and an obtained TA value. When an existing TA value exists, the existing TA value may be updated with a newly calculated TA value.

When the valid TA values of all the configured uplink CCs are not obtained within the predetermined time, the eNB may generate uplink timing group information based on the following schemes.

e-i) generating group information based on parameters of uplink CCs for remaining uplink CCs, separately from CCs that obtain valid TA values e-ii) when an uplink CC that fails to obtain a valid TA value but has the same CC parameter as a CC parameter of an uplink CC that obtains a valid TA value or an uplink CC that is fails to obtain a valid TA value but has the same characteristic with respect to CC parameters associated with a propagation characteristic exists, configuring, by an eNB, the CC that fails to obtain the valid TA value to be included in the same group based on the valid TA value.

That is, the eNB may include the CC that fails to obtain the valid TA value in a group configured based on the valid TA value. This may be applicable when characteristic information of the CC is similar or identical.

The eNB may transmit the generated uplink timing group information to the UE through a downlink PCC of the corresponding UE (step S455). The generated uplink timing group information may be transmitted through a PDCCH channel, an RRC signaling, a broadcast channel, and the like, or may be transmitted through an MAC signaling (L2 message). A message including the uplink timing group information will be described in detail with reference to FIG. 8.

Accordingly, the UE 480 may set a delegate CC in a group based on the received uplink timing group information a previously obtained TA value of each CC (step S460).

The delegate CC may be set based on the following conditions, from among CCs that are capable of obtaining TA values for an uplink synchronization.

f-i) a CC having a lowest center frequency value
f-ii) a CC having a center frequency value that is closest to a mean value
f-iii) a CC having a highest center frequency value
f-iv) a CC having a broadest frequency band
f-v) a CC that is set to be used for monitoring downlink quality A CC satisfying one of the conditions may be set to be a delegate CC. Here, a CC set for monitoring the downlink quality may include an SCell in which a radio link monitoring (RLM) is defined. In particular, the RLM may include a process in which a UE monitors downlink quality based on a cell-specific reference (CRS) signal so as to detect downlink quality of a serving cell set between the UE and an eNB. In this example, the UE may predict the downlink quality based on predetermined parameters which are defined by a ratio of the measured CRS to energy of control channels. The RLM may be set based on the following conditions.

To predict the downlink quality through the RLM, a value that expresses a ratio of reception energy of a resource element (RE) (single sub-carrier in a single OFDM symbol) through which a PDCCH/physical control format indicator channel (PCFICH) is transmitted, to an average RE energy of the CRS based on a dB unit may be used as a criterion. From among the parameters, a parameter $Q_{out}$ that is a criterion to determine an out-of-sync state may be determined based on a parameter set for transmitting a PDCCH/PCFICH and a value of which a block error rate (BER) of hypothetical PDCCH (based on a DCI format 1A) transmission based on an error of the PCFICH is greater than or equal to 10%. The value may be changed based on a number of antenna ports through which the CRS is transmitted.

For example, when the CRS is transmitted through a single antenna port, a ratio of energy between the PDCCH and the CRS to be determined as $Q_{out}$ may be based on 4 dB, and when the CRS is transmitted through two or more antenna ports, $Q_{out}$ may be based on 1 dB. From among the parameters, a parameter $Q_{in}$ that is a criterion to determine synchronization restoration or in-sync state may be determined based on a value having a sufficiently large reliability when compared to $Q_{out}$. That is, a parameter set for transmitting the PDCCH/PCFICH and a value of which a BER of hypothetical PDCCH (based on a DCI format 1C) transmission based on an error of the PCFICH is greater than or equal to 2% may be used. The value may be changed based on a number of antenna ports through which the CRS is transmitted. For example, when the CRS is transmitted through a single antenna port, a ratio of energy between the PDCCH and the CRS to be determined as $Q_{in}$ may be based on 0 dB, and when the CRS is transmitted through two or more antenna ports, $Q_{in}$ may be based on −3 dB. A reason that an energy ratio used for determining $Q_{in}$ is lower than $Q_{out}$ is that the energy ratio is based on the parameter set for transmitting the PDCCH/PCFICH and the BER of the hypothetical PDCCH transmission.

The parameters set for transmitting the PDCCH/PCFICH may include a DCI format of a PDCCH, a number of OFDM symbols through which control information of a subframe is transmitted, an aggregation level indicating a self-duplication rate of the PDCCH, and the like. The parameters may be affected by a bandwidth of a downlink. Also, $Q_{out}$ and $Q_{in}$ is may be affected based on whether a UE performs discontinuous reception (DRX) with respect to a corresponding cell.

In this example, according to a method of setting a delegate CC for each uplink timing group, the same criterion may be used for all groups or a different criterion may be used for each timing group. That is, the delegate CC may be selected based on a network state of each group, characteristics of CCs forming each group, and the like. Also, when information associated with a delegate CC is included in an uplink timing group, the UE may set a corresponding CC to be the delegate CC.

When the delegate CC is set and a predetermined CC needs to obtain an uplink synchronization, for example, when a TA value needs to be reset, synchronization information may be obtained through a delegate CC of an uplink timing group where the corresponding CC is included.

In FIG. 4, the eNB 490 may always store a TA value of each CC of the UE 490, or may store a TA value only while a timer operates. In the case where the eNB 490 always stores a TA value, when the eNB 490 fails to obtain a TA value while the timer operates, an uplink timing group may be configured based on a previously stored TA value.

Although not illustrated in FIG. 4, the UE 490 may correct a received uplink timing group. Here, correcting of the uplink timing group may indicate a process in which the UE 490 combines contained information and the generated uplink timing group information is received from the eNB 480, so as to accurately correct a portion of the uplink timing group.

g-i) CCs of which a difference in center frequency values is greater than or equal to a threshold, are assigned to different groups. When a difference in the center frequency values of the CCs is high, delay occurring in a wireless signal propagation process may be changed and thus, a difference in TA values may also increase.

g-ii) CCs to which different beamforming schemes are applied are assigned to different groups. TA values are highly likely to be different from each other when the beamforming schemes are different from each other.

g-iii) CCs that are set to be updated every time an uplink synchronization update request exists are assigned to different groups.

g-iv) CCs that do not provide services in a macrocell or CCs that provide services in a space superposed on the macrocell by a femtocell, a picocell, a microcell, a relay, a repeater, and the like may have different characteristics from CCs that provide services by the macrocell and thus, the CCs are configured to be different groups. That is, CCs used in different wireless network devices may be assigned to different groups.

g-v) a CC that has an uplink synchronization update request from the eNB 490 may be a CC that has a changed synchronization and thus, the CC may be assigned to a different group.

As described in the foregoing, the UE 480 may correct a group based on two schemes. That is, the UE 480 may distinguish a CC having a high probability of being included in a different group or may distinguish a CC having a high probability of being included in the same group, and may change group information received from the eNB 490.

Figure 5:
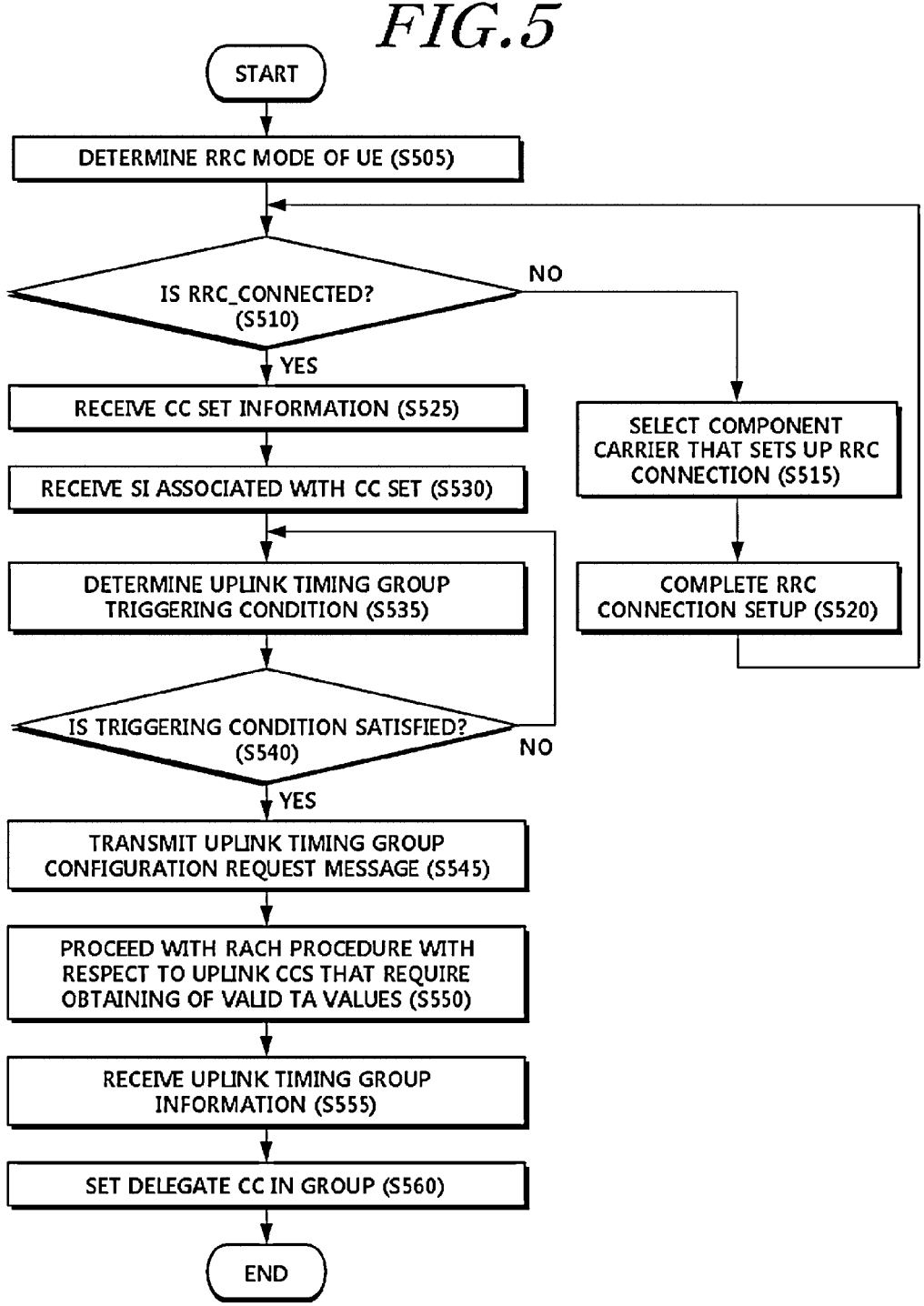
FIG. 5 is a signal flow diagram of a UE that configures an uplink timing group according to an embodiment of the present invention.

FIG. 5 shows a process performed in a UE according to an embodiment of the present invention.

Referring to FIG. 5, the UE may determine an RRC mode (step S505). When the RRC mode is an IDLE mode (step S515), the UE may perform RRC connection setup. Accordingly, the UE may select a predetermined CC through which RRC connection is performed (step S515), may transmit an RRC connection request message to the selected predetermined CC, may receive an RRC connection setup message from the eNB through the selected predetermined CC, and may transmit an RRC connection setup complete message to the eNB so as to complete RRC connection setup (step S520).

Conversely, when the RRC mode is an RRC_CONNECTED mode (step S510), the UE may receive CC set information through a DL PCC (step S525), and may receive system information (SI) associated with the CC set through the DL PCC (step S530). The UE that receives the CC set information and the SI may determine whether an initial group configuration is required for an uplink timing group of CCs configured for the UE or whether updating of the configured uplink timing group is required, that is, may determine a triggering condition for configuring an uplink timing group (step S535). The CC set information may be received from is the eNB through a PCell or a PCC.

When it is determined that a corresponding triggering condition is satisfied, that is, it is determined whether the initial group configuration is required or whether updating of the configured uplink timing group is required (step S540), the UE may transmit an uplink timing group configuration request message including indication information indicating the determined triggering cause value through a UL PCC (step S545). When the triggering condition is not satisfied (step S540), whether a triggering condition is satisfied may be determined, after a predetermined time.

The UE that transmits the uplink timing group configuration request message may perform an RACH procedure with respect to uplink CCs that fail to obtain valid TA values (step S545). When it is required, the RACH procedure may be additionally performed with respect to all uplink CCs, irrespectively of whether valid TA values are obtained.

The UE may receive uplink timing group information from the eNB (step S555). Here, the eNB may configure an uplink timing group based on information obtained during the RACH procedure, for example, a TA value and the like, and may include uplink timing group information associated with the configured uplink timing group in a random access response message for transmission to the UE.

The uplink timing group information may correspond to information associated with a configuration of the uplink timing group, and may include i) identification information is associated with a timing group and identification information associated with a CC included in the timing group or ii) information indicating identification information associated with the timing group and the CC included in the timing group. For example, to generate an uplink timing group with respect to a UL CC F that fails to obtain a valid TA value, a parameter of the UL CC F may be used or the UL CC F may be included in another UL CC that has the same parameter as the UL CC F and obtains a valid TA value.

The UE may determine the uplink timing group information received through a downlink PCC, so as to set a delegate CC in each uplink timing group (step S560). After setting the delegate CC, a subsequent process may be selectively performed. The UE may select a preamble through the delegate CC and may transmit the selected preamble. This may be applicable when updating of a TA is required after the delegate CC is set.

The UE may receive a random access response message from the eNB, and particularly, may receive uplink allocation information of the UE and TA information of each uplink group. The UE may determine a TA value arranged in a table corresponding to a group index of each uplink timing group, or may determine a TA difference value including a unit error for each timing group based on a predetermined reference TA value. Also, the UE may determine an error for each uplink timing group that has a size of an integer-multiple of a predetermined unit value. Also, the UE may determine an error for each uplink timing group that is specified in detail. Also, the UE may determine a TA indicator determined to be an is indicator based on a predetermined rule.

Subsequently, the UE may verify the validity of a received TA through a CR procedure. When the TA is determined to be valid, the UE may update a TA value for each uplink timing group.

According to an embodiment of the present invention, the UE may transmit the updated TA value for each uplink timing group to the eNB through a delegate CC. That is, a procedure of determining the TA value may be additionally performed to obtain accurate synchronization with the eNB.

According to an embodiment of the present invention, the UE may correct the received information associated with the configuration of the uplink timing group based on information associated with a previously obtained UL CC, so as to increase the accuracy of the configuration of the uplink timing group.

Figure 6:
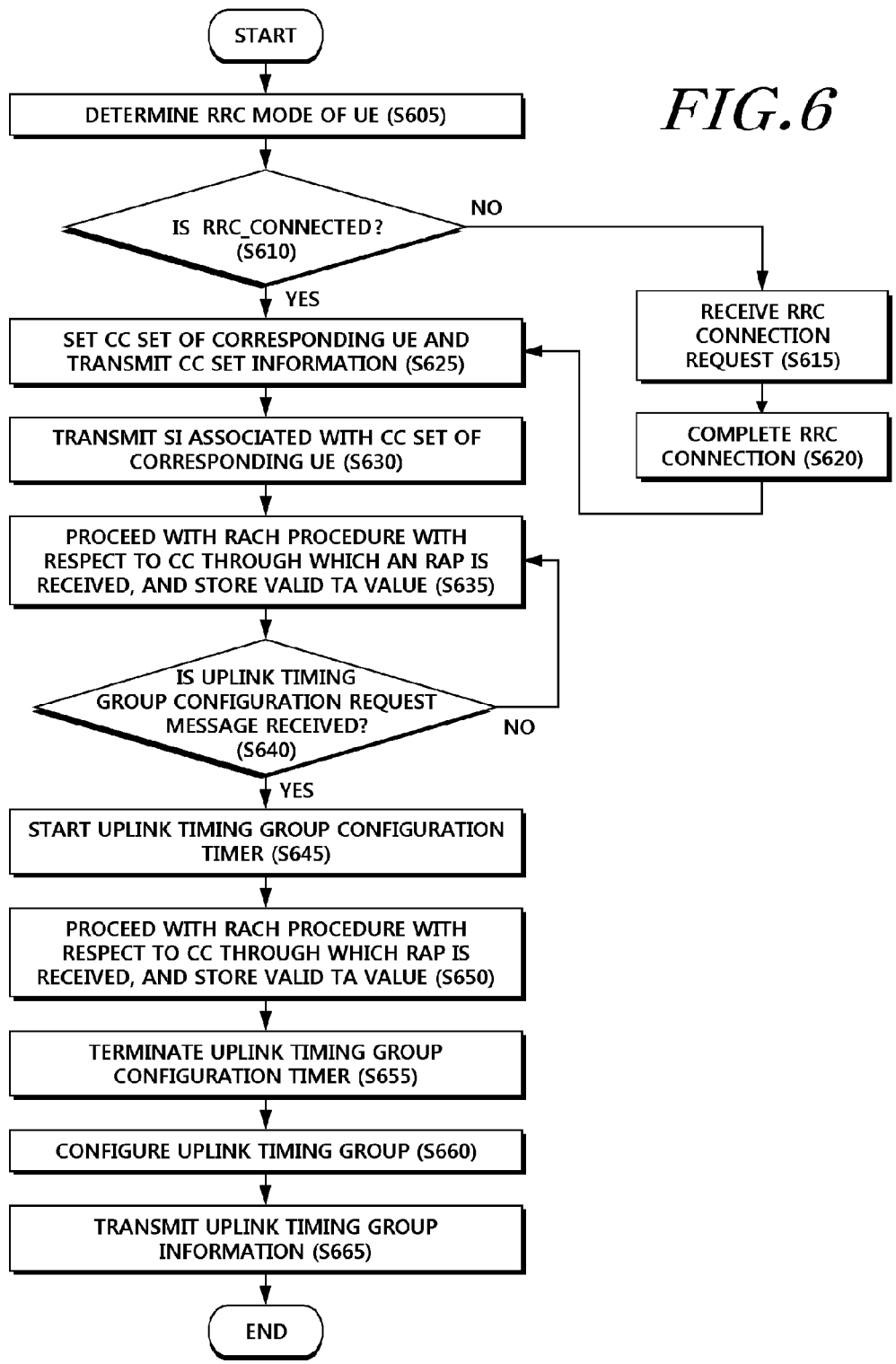
FIG. 6 is a signal flow diagram of an eNB that configures an uplink timing group according to an embodiment of the present invention.

FIG. 6 is diagram illustrating a process performed in an eNB according to an embodiment of the present invention.

Referring to FIG. 6, the eNB may determine an RRC mode of a UE (step S605). When the RRC mode is different from an RRC_CONNECTED mode, the eNB may receive an RRC connection request from the UE (step S615), and may complete RRC connection (step S620). As described in the foregoing, a CC that forms a PCell may be used as a CC that performs the RRC connection.

The eNB may set a CC set including at least one CC available for the UE that is in the RRC_CONNECTED mode, and may transmit information associated with the set CC set to the UE through a DL PCC that forms a PCell or a PCC (step S625).

The eNB may transmit, through the DL PCC, SI associated with at least one predetermined CC included in the CC set based on the CC set information of the UE (step S630). Here, the CC set information may be transmitted through an RRC message. Also, the SI of the set CC set may be transmitted through a broadcast channel.

Subsequently, the eNB may receive an RAP from the UE. When it is required, the eNB may store TA values of CCs for which an RACH procedure is completed, based on an UE identifier of a corresponding UE (step S635). The eNB may store a TA value obtained through the RACH procedure with the UE, to match a UE identifier such as a C-RNIT, a T-C-RNTI, UE identify information of a UE that transmits a corresponding RACH. The process of storing the TA value in accordance with the UE identifier may not be performed selectively, by a system based on system operation.

The eNB may determine whether an uplink timing group configuration request message is transmitted from the UE (step S640), so that the eNB may determine whether a triggering for configuration of an uplink timing group occurs from the UE.

The eNB that receives the uplink timing group configuration request message may start operation of a timer for configuring an uplink timing group (step S645). While the is timer operates, the eNB may receive an RAP transmitted from the UE, and may proceed with an RACH procedure with respect to a CC through which the RAP is received. Subsequently, the eNB may store TA values of CCs for which the RACH procedure is completed, based on an eigen-identifier of the corresponding UE (step S650). The eNB may perform grouping of a plurality of UEs based on an identical TA value for storing, and TA values corresponding to a predetermined UE may be selectively extracted for ordering when it is required.

When the RACH procedure with respect to all uplink CCs of the UE that transmits the uplink timing group configuration request message is completed, when the RACH procedure with respect to uplink CCs that fail to obtain valid TA values is completed, or when the uplink timing group configuration timer expires, the eNB may terminate operation of the uplink timing group configuration timer (step S655).

Subsequently, the eNB may configure an uplink timing group based on obtained TA values of uplink CCs (step S660), or the eNB may set an uplink timing group based on the TA values stored in step S635. As an example of setting an uplink timing group, CCs having TA values included in a predetermined range may be configured to be included in a single uplink timing group based on the obtained valid TA values of the uplink CCs.

When configuration of the uplink timing group is completed, the eNB may transmit information associated with the configured uplink timing group to the UE (step S665). The information associated with the configured uplink timing group may be transmitted in a is form of an RRC message, through a PCC, or may be transmitted in a form of a PDCCH channel.

Hereinafter, an embodiment associated with a format of an uplink timing group configuration request message will be described.

Figure 7:
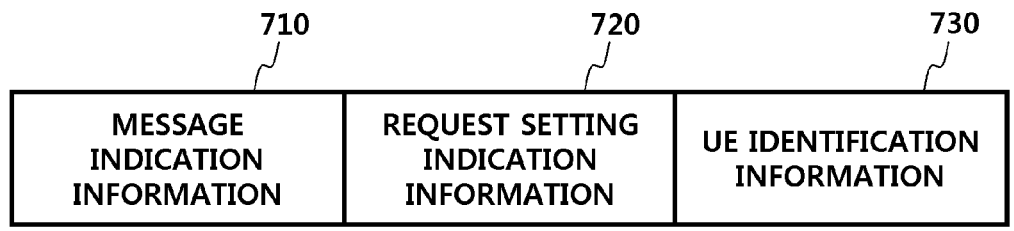
FIG. 7 is a diagram illustrating a configuration of an uplink timing group configuration request message according to an embodiment of the present invention.

FIG. 7 is a diagram illustrating a configuration of an uplink timing group configuration request message according to an embodiment of the present invention.

Referring to FIG. 7, the message may include message indication information 710 indicating that the message corresponds to a message requesting configuration of an uplink timing group, request setting indication information 720 indicating a condition used when the uplink timing group configuration request message is triggered, and UE identification information 730 identifying a corresponding UE.

The message indication information 710 may indicate whether the corresponding message is the uplink timing group configuration request message, and may be configured as, for example, an MAC header.

The request setting indication information 720 may indicate whether the corresponding message is a message requesting adding of an uplink CC to an uplink timing group or updating of the uplink timing group. For example, the UE may set the request setting indication information to '1' when it is determined that an initial configuration is required, and may set the request setting indication information to '0' when it is determined that updating of the group is required, and may transmit the uplink timing group configuration request message. The request setting indication information may be inversely set and applied.

The UE identification information 730 may include a C-RNTI, a T-C-RANTI, UE identify information, and the like. In a case of an RACH, the UE identification information 730 may be included when the UE transmits a preamble and requests configuration of an uplink timing group. However, in a case of an RRC/MAC message, the UE identification information 730 may not be included.

Figure 8:
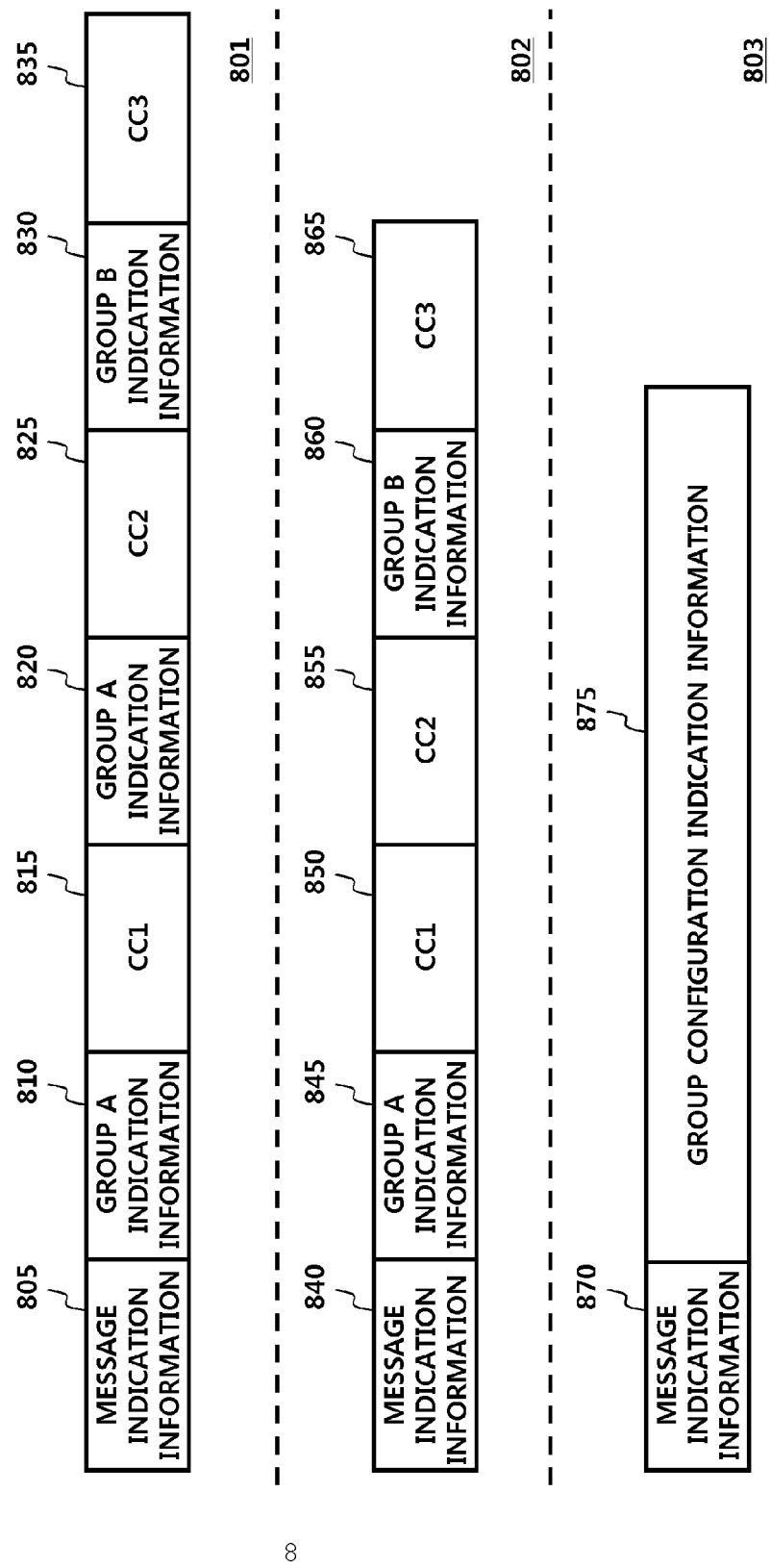
FIG. 8 is a diagram illustrating a method of configuring a message including information associated with a configuration of an uplink timing group according to an embodiment of the present invention.

FIG. 8 is a diagram illustrating a method of configuring an uplink timing group configuration message according to an embodiment of the present invention.

Referring to FIG. 8, the uplink timing group configuration message may include message indication information 805 indicating that the transmitted message is an uplink timing group configuration message, group indication information 810, 820, and 830 identifying a corresponding uplink timing group, and identification information 815, 825, and 835 associated with a CC of corresponding group indication information, as shown in the diagram 801. The diagram 801 may show that indication information of a corresponding group and information associated with a CC included in the corresponding group are alternatively included.

The diagram 802 may show a message including information associated with at least one CC of a single uplink timing group. When a message format of the diagram 802 is used, configured CCs are included in the same group until an indicator of another group is provided. That is, the message may include information associated with at least one CC through is a single piece of group indication information. In this example, indication information (CC indicator) associated with a CC and a group indicator may be distinguished by a field value. However, it is advantageous in that a length of the message of the diagram 802 is shorter than the message of the diagram 801.

The diagram 803 may show a message format that determines uplink timing group information based on indication information of a table previously configured based on embodiments of the present invention. The message format of the diagram 803 may include message indication information 870 indicating that the message format includes uplink timing group configuration indication information and group configuration indication information 875 that defines a matching relationship between identification (indication) information of a corresponding group and each CC. The group configuration indication information 875 may express all configurable events that may occur when UE uplink CCs configured between the eNB and the UE are grouped. A table that expresses the events associated with configuration of an uplink timing group may be shared between the UE and the eNB.

For example, Table 1 may show combinations associated with a configurable uplink timing group when a maximum number of uplink CCs that a single UE is able to configure is 3.

TABLE 1

| Group configuration table indication information | Number of configured uplink CCs | uplink timing group information | | |
|---|---|---|---|---|
| 000 | 1 | Group A = CC1 | | |
| 001 | 2 | Group A = CC1, CC2 | | |
| 010 | 2 | Group A = CC1 | Group B = CC2 | |
| 011 | 3 | Group A = CC1, CC2, CC3 | | |
| 100 | 3 | Group A = CC1, CC2 | Group B = CC3 | |
| 101 | 3 | Group A = CC1, CC3 | Group B = CC2 | |
| 110 | 3 | Group A = CC2, CC3 | Group B = CC1 | |
| 111 | 3 | Group A = CC1 | Group B = CC2 | Group C = CC3 |

To express the events associated with an uplink timing group associated with the 3 uplink CCs, 3 bits may be required. For example, when a value set for the group setting indication information 875 is 010, an uplink timing group in which CC1 is included in Group A and CC2 is included in Group B may be set. The group configuration indication information may be transmitted through a MAC control element message. When a minimum payload length of the MAC message is 8 bits and a reserved bit is 3 bits, the indication information associated with the configuration of the uplink timing group may be included in the 3 bits for transmission.

Figure 9:
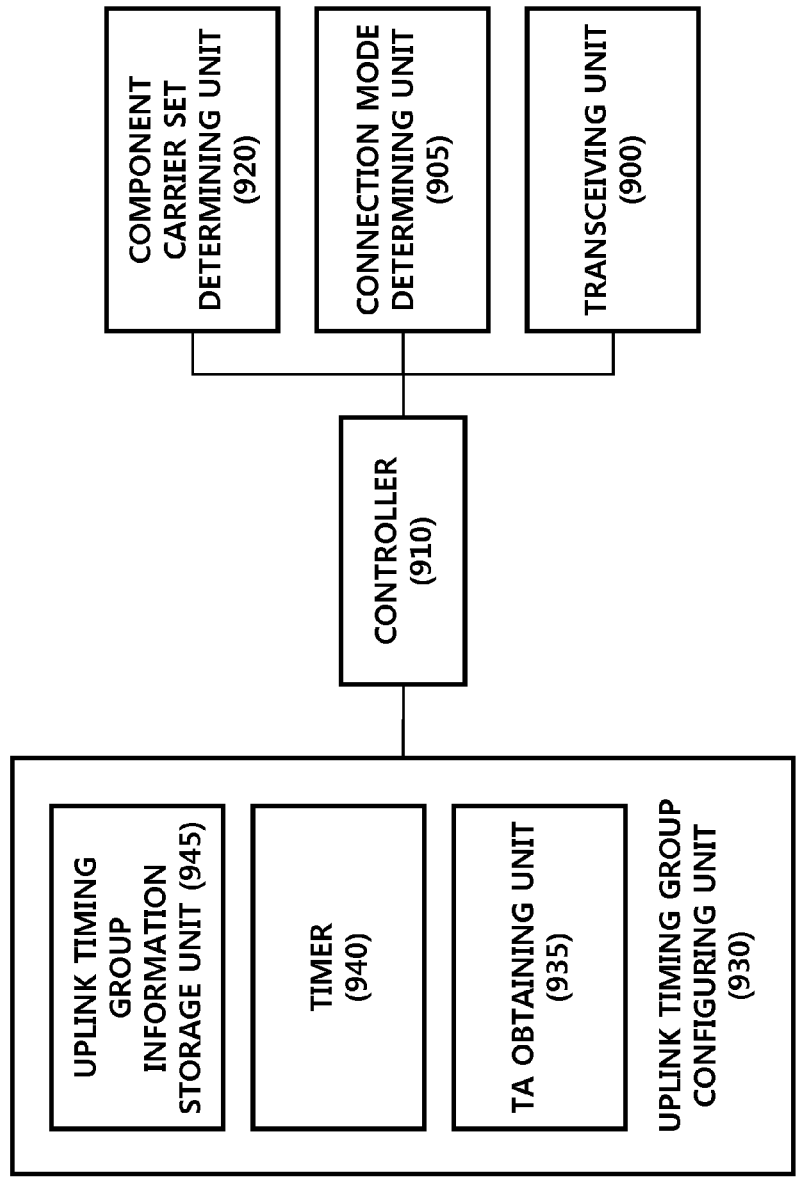
FIG. 9 is a diagram illustrating a configuration of a transmitting apparatus according to an embodiment of the present invention.

FIG. 9 is a diagram illustrating a configuration of a transmitting apparatus according to an embodiment of the present invention.

The transmitting apparatus may include a transceiving unit 900, a controller 910, and an uplink timing group configuring unit 930. Additionally, the transmitting apparatus may include a connection mode determining unit 905 and a CC set determining unit 920. Also, the uplink timing group configuring unit 930 may include a TA obtaining unit 935, a timer 940, and an uplink timing group information storage unit 945.

The connection mode determining unit 905 may determine an RRC connection with a UE. When the UE is in an RRC_IDLE mode, the connection mode determining unit 905 may determine whether an RRC connection request exists from the UE and completes RRC connection, based on controlling of the controller 910. The controller 910 may control the transceiving unit 900 to receive an RRC connection request message from the UE through a PCell which is a CC that performs the RRC connection, to transmit an RRC connection setup message, and to receive an RRC connection setup complete message from the UE, so that RRC is connection is performed.

The CC set determining unit 920 may select at least one CC based on information associated with a CC assigned to a corresponding UE, for example, an uplink synchronization time difference among CCs, type information of each CC, a center frequency location of each CC, a service support type of each CC, a network service of each CC, and the like, and may configure CC set information of the UE. The CC set information may include at least one DL CC/UL CC information set for each UE, and may be transmitted through the transceiving unit 900 based on controlling of the controller 910. The CC set information may be transmitted through use of an RRC reconfiguration message via a PCell or a DL PCC that forms the PCell. Also, the controller 910 may control, based on the CC set information, the transceiving unit 900 to transmit SI associated with a predetermined CC through use of a broadcast channel through a DL PCC.

Hereinafter, the uplink timing group configuring unit 930 will be described.

When an uplink timing group configuration request message is received from the UE through the transceiving unit 900, the uplink timing group configuring unit 930 may configure an uplink timing group based on controlling of the controller 910. In this example, the uplink timing group configuring unit 930 may operate the timer 940. In particular, when the transceiving unit 900 receives an RAP from the UE, the controller 910 may provide the RAP to the uplink timing group configuring unit 930. The uplink timing group configuring unit 930 is may proceed with an RACH procedure with respect to a CC through which the RAP is received, and the TA obtaining unit 935 may store TA values of CCs for which the RACH procedure is completed based on an eigen-identifier of a corresponding UE. The TA obtaining unit 935 may perform grouping of a plurality of UEs based on an identical TA value for storing, and may selectively extract TA values corresponding to a predetermined UE for ordering when it is required.

When the RACH procedure with respect to all UL CCs of the UE is completed, when the RACH procedure with respect to UL CCs that fail to obtain valid TA values is completed, or when the uplink timing group configuration timer 940 expires, the uplink timing group configuring unit 930 may terminate the operation of the timer 940, and may configure an uplink timing group based on obtained TA values of UL CCs.

The uplink timing group information storage unit 940 may store information associated with the uplink timing group temporarily or during a predetermined period. The uplink timing group configuring unit 930 may use a TA value stored in the uplink timing group information storage unit 945. The uplink timing group information storage unit 945 may temporarily store a TA value obtained through the RACH procedure while the timer 940 operates, or may delete a TA value transmitted to the UE. The uplink timing group information storage unit 945 may continuously accumulate and store an obtained TA value, and may provide the stored value when missing information is found in the future RACH procedure, so as to is configure an uplink timing group.

The uplink timing group configuring unit 930 may configure CCs having TA values within a predetermined range to be a single uplink timing group, through use of obtained valid TA values of uplink CCs. The uplink timing group configuring unit 930 may transmit timing group information associated with the configured uplink timing group to the UE through the transceiving unit 900 based on controlling of the controller 910. The uplink timing group information may include information associated with a CC included in an uplink timing group, a TA value of each CC, and the like. As described in FIG. 8, the uplink timing group information may include identification information associated with an uplink timing group and identification information of each CC included in the corresponding uplink timing group, or information indicating a matching relationship between an uplink timing group and identification information of a CC included in the uplink timing group, that is, indication information associated with Table 1. The uplink timing group information may be transmitted in a form of an RRC message/PDCCH channel through a PCC.

Therefore, the UE may set a delegate CC with respect to an uplink timing group, and may adjust a TA with respect to all CCs in the corresponding uplink timing group by transmitting an RAP through the delegate CC.

Figure 10:
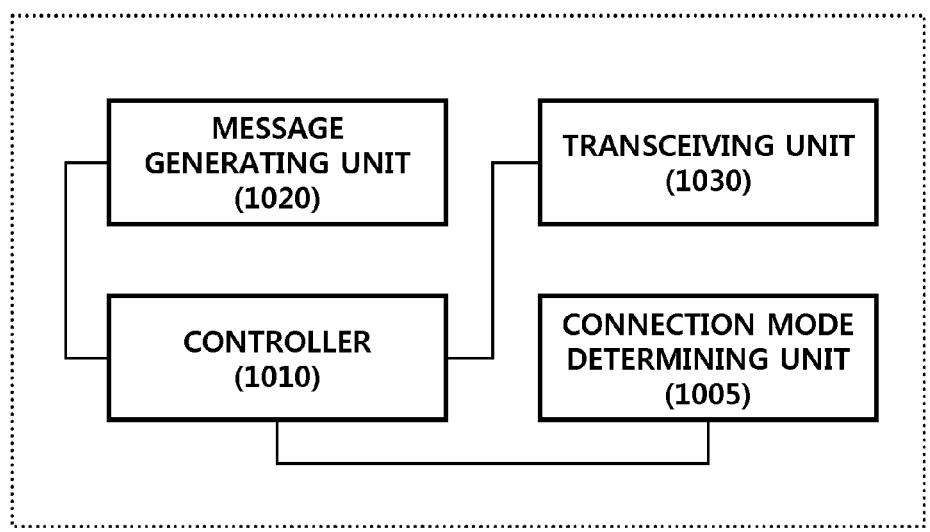
FIG. 10 is a diagram illustrating a configuration of a receiving apparatus according to an embodiment of the present invention.

FIG. 10 is a diagram illustrating a configuration of a receiving apparatus according to an embodiment of the present invention. The receiving apparatus may include a is controller 1010, a transceiving unit 1030, a message generating unit 1020, and a connection mode determining unit 1005.

Referring to FIG. 10, the connection mode determining unit 1005 may determine a connection mode with an eNB. When the connection mode is an RRC_IDLE or when an uplink synchronization with the eNB is not obtained, the connection mode determining unit 1005 may set up an RRC connection with the eNB based on controlling of the controller 1010, so as to change the mode into an RRC_CONNECTED Mode or to obtain an uplink synchronization.

The controller 1010 may select a predetermined CC, may control the transceiving unit 1030 to transmit an RRC connection request message through the selected predetermined CC, to receive an RRC connection setup message, and to transmit an RRC connection setup complete message to the eNB. A CC that forms a PCell may be used as a CC that is to perform RRC connection. Also, the controller 1010 may receive CC set information and system information (SI) associated with the CC set via a DL PCC through use of the transceiving unit 1030. The transceiving unit 1030 may perform transmission and reception of a wireless signal with the eNB, and the corresponding wireless signal may include information that is transmitted to and received from the eNB.

The controller 1010 may receive the CC set information and the SI, and may determine or decide a triggering condition for configuring an uplink timing group, that is, whether an initial group configuration associated with an uplink timing group of configured CCs is required or whether updating of information associated with the set uplink timing group is required.

When a corresponding triggering condition is satisfied, the controller 1010 may control the message generating unit 1020 to generate an uplink timing group configuration request message including indication information indicating the determined triggering cause value. The generated message may be transmitted by the transceiving unit 1030 through a UL PCC.

In particular, the message generating unit 1020 may generate an uplink timing group configuration request message that requests configuration of an uplink timing group, and the message requesting configuration of the uplink timing group may include a result of determination associated with the configuration of the uplink timing group, for example, whether an initial configuration is required or updating of the group is required.

Although embodiments of the present invention describe that the triggering result is included in the uplink timing group configuration request message as an example, the controller 1010 may perform controlling to perform RACH excluding the triggering result when transmission of the uplink timing group configuration request message is not required, that is, when the eNB predicts the result.

After transmitting the uplink timing group configuration request message based on controlling of the controller 1010, the transceiving unit 1030 may perform the RACH is procedure with respect to uplink CCs that fail to obtain valid TA values. When it is required, the transceiving unit 1030 may be controlled to additionally perform the RACH procedure with respect to all uplink CCs, irrespective of whether valid TA values are obtained.

After performing the RACH procedure, the transceiving unit 1030 may receive, from the eNB, uplink timing group information through a random access response message. The uplink timing group information may be information associated with a configuration of an uplink timing group, and may include i) identification information associated with a timing group and identification information of a CC included in the timing group or ii) information indicating identification information associated with a timing group and a CC included in the timing group.

To increase the accuracy of the configuration of the uplink timing group, received information associated with the configuration of the uplink timing group may be corrected based on information associated with a previously obtained UL CC. For example, information associated with the configuration of the uplink timing group may be received from the eNB and the like during the RACH procedure. The received information may be different from a circumstance determined by the UE. It is because a portion of data may be missing during the RACH procedure, or a portion of data may be transferred to the eNB after a predetermined period of time. Therefore, when information is stored in advance and information associated with a configuration of a link timing group is received, the received information may be corrected based on the information stored in advance to be appropriate for a network state of the UE.

The controller 1010 may set a delegate CC in each uplink timing group based on the received uplink timing group information. In particular, the controller 1010 may set the delegate CC based on delegate CC information of each group included in the uplink timing group information. Conversely, when the delegate CC information for each group is not included in the uplink timing group information, the controller 1010 may set the delegate CC based on a condition for setting a delegate CC. After setting the delegate CC, the controller 1010 may control the transceiving unit 1030 to transmit a selected preamble through the delegate CC. This may be applicable when updating of a TA is required after the delegate CC is set.

Embodiments of the present invention may provide a method that enables each CC or each group to obtain a different uplink synchronization for a plurality of CCs, through use of an uplink timing group. Accordingly, when a UE transmits information in an uplink by simultaneously using a plurality of CCs, a data transmission error due to an error in obtaining synchronization and a reception delay in an eNB may be reduced. Also, according to embodiments of the present invention, the UE may obtain an uplink synchronization based on a type of each CC, a location of a center frequency, and a service type when an uplink synchronization standard is different for each of a plurality of CCs.

The invention claimed is:

1. A method of transmitting information associated with an uplink timing group, the method comprising:
   receiving, by an evolved Node-B from a user equipment, a message requesting configuration of an uplink timing group;
   performing random access (RACH) with the user equipment during a predetermined period of time, so as to generate an uplink timing group; and
   transmitting, to the user equipment, a message including information associated with a configuration associated with the generated uplink timing group,
   wherein the uplink timing group corresponds to a set of one or more component carriers to which identical uplink timing advance is applied.

2. The method as claimed in claim 1, wherein the message requesting configuration of the uplink timing group comprises indication information of 1 bit that indicates whether an initial configuration of the uplink timing group is required or whether updating of uplink timing group information is required.

3. The method as claimed in claim 1, wherein the message including the information associated with the configuration of the uplink timing group comprises information indicating that the message is an uplink timing group configuration message, group indication information identifying each uplink timing group, and identification information associated with one or more component carriers included in a correspond uplink timing group.

4. The method as claimed in claim 1, wherein the message including the information associated with the configuration of the uplink timing group comprises indication information determined to be identification information associated with a corresponding uplink timing group from among combinations associated with an uplink timing group determined based on a number of configured uplink component carriers of the user equipment, and identification information associated with one or more component carriers included in each uplink timing group.

5. The method as claimed in claim 1, wherein the random access performing step starts operation of a timer for configuring an uplink timing group, after receiving the message requesting configuration of the uplink timing group, and performing random access (RACH) with the user equipment during the predetermined period of time.

6. A method of receiving information associated with an uplink timing group, the method comprising:
   transmitting, by a user equipment to an evolved Node-B, a message requesting configuration of an uplink timing group;
   performing random access (RACH) with the evolved Node-B during a predetermined period of time;
   receiving information associated with a configuration of an uplink timing group from the evolved Node-B; and
   performing uplink timing advance in accordance with a corresponding uplink timing group based on the received information associated with the configuration of the uplink timing group,
   wherein the uplink timing group corresponds to a set of one or more component carriers to which identical uplink timing advance is applied.

7. The method as claimed in claim 6, wherein the message requesting configuration of the uplink timing group comprises indication information of 1 bit that indicates whether an initial configuration of the uplink timing group is required or updating of uplink timing group information is required.

8. The method as claimed in claim 6, wherein the message including information associated with the configuration of the uplink timing group comprises information indicating that the message is an uplink timing group configuration message, group indication information identifying each uplink timing group, and identification information associated with one or more component carriers included in a corresponding uplink timing group.

9. The method as claimed in claim 6, wherein the message including the information associated with the configuration of the uplink timing group comprises indication information determined to be identification information associated with a corresponding uplink timing group from among combinations associated with an uplink timing group determined based on a number of configured uplink component carriers of the user equipment, and identification information associated with one or more component carriers included in each uplink timing group.

10. The method as claimed in claim 6, wherein performing of random access (RACH) with the evolved Node-B during the predetermined period of time comprises:
    randomly performing RACH through a component carrier included in the uplink timing group, or sequentially performing RACH in a predetermined order, or simultaneously performing RACH.

11. The method as claimed in claim 6, wherein performing of uplink timing advance comprises:
    setting a delegate component carrier of the uplink timing group,
    wherein one of a component carrier having a lowest center frequency value, a component carrier having a center frequency value closest to a mean value, a component carrier having a highest center frequency value, a component carrier having a broadest frequency band, and a component carrier set for monitoring a downlink quality is selected to be the delegate component carrier from among component carriers included in the uplink timing group.

12. The method as claimed in claim 11, wherein performing of uplink timing advance comprises:
    receiving an uplink timing advance value associated with the uplink timing group through the set delegate component carrier; and
    updating the uplink timing group based on the received uplink timing advance value.

13. The method as claimed in claim 6, wherein transmitting of the message requesting configuration of the uplink timing group to the evolved Node-B comprises:
    determining whether the user equipment corresponds to one of a case in which a response to uplink transmission data does not exist through a few uplink component carriers of the uplink timing group, a case in which resetting of a downlink synchronization is requested by the evolved Node-B, a case in which an alignment timer set for each component carrier expires, a case in which an alignment timer set by the user equipment expires, a case in which a downlink/uplink connection setup is changed, and a case in which the user equipment performs a handover.

14. An apparatus for transmitting information associated with an uplink timing group, the apparatus comprising:

a transceiving unit to receive, from a user equipment a message requesting configuration of an uplink timing group;

an uplink timing group configuring unit to generate an uplink timing group by performing random access (RACH) with the user equipment during a predetermined period of time; and a controller to control the transceiving unit to transmit a message including information associated with a configuration of the generated uplink timing group to the user equipment, wherein the uplink timing group corresponds to a set of one or more component carriers to which identical uplink timing advance is applied.

15. The apparatus as claimed in claim 14, wherein the message requesting configuration of the uplink timing group comprises indication information of 1 bit that indicates whether an initial configuration of the uplink timing group is required or whether updating of uplink timing group information is required.

16. The apparatus as claimed in claim 14, wherein the message including the information associated with the configuration of the uplink timing group comprises information indicating that the message is an uplink timing group configuration message, group indication information identifying each uplink timing group, and identification information associated with one or more component carriers included in a corresponding uplink timing group.

17. The apparatus as claimed in claim 14, wherein the message including the information associated with the configuration of the uplink timing group comprises indication information determined to be identification information associated with a corresponding uplink timing group from among combinations associated with an uplink timing group determined based on a number of configured uplink component carriers of the user equipment and identification information associated with one or more component carriers included in each uplink timing group.

18. The apparatus as claimed in claim 14, wherein the apparatus starts operation of a timer for configuring the uplink timing group after receiving the message requesting configuration of the uplink timing group, and performs random access (RACH) with the user equipment during the predetermined period of time.

19. An apparatus for receiving information associated with an uplink timing group, the apparatus comprising:
a transceiving unit to transmit, to an evolved Node-B, a message requesting configuration of an uplink timing group; and
a controller to perform random access (RACH) with the evolved Node-B during a predetermined period of time,
wherein the transceiving unit receives information associated with a configuration of an uplink timing group from the evolved Node-B;
the controller performs uplink timing advance in accordance with a corresponding uplink timing group based on information associated with the received information associated with the configuration of the uplink timing group; and
the uplink timing group corresponds to a set of one or more component carriers to which identical uplink timing advance is applied.

20. The apparatus as claimed in claim 19, wherein the message requesting configuration of the uplink timing group comprises indication information of 1 bit that indicates whether an initial configuration of the uplink timing group is required or whether updating of uplink timing group information is required.

21. The apparatus as claimed in claim 19, wherein the message including the information associated with the configuration of the uplink timing group comprises information indicating that the message is an uplink timing group configuration message, group indication information identifying each uplink timing group, and identification information associated with one or more component carriers included in a corresponding uplink timing group.

22. The apparatus as claimed in claim 19, wherein the message including the information associated with the configuration of the uplink timing group comprises indication information determined to be identification information associated with a corresponding timing group from among combinations associated with an uplink timing group determined based on a number of configured uplink component carriers of the user equipment and identification information associated with one or more component carriers included in each uplink timing group.

23. The apparatus as claimed in claim 19, wherein, when the controller performs random access (RACH) with the evolved Node-B during the predetermined period of time, the controller randomly performs RACH through a component carrier included in the uplink timing group, or sequentially performs RACH in a predetermined order, or simultaneously performs RACH.

24. The apparatus as claimed in claim 19, wherein, when the controller performs uplink timing advance, the controller sets a delegate component carrier associated with the uplink timing group, and one of a component carrier having a lowest center frequency value, a component carrier having a center frequency value closest to a mean value, a component carrier having a highest center frequency value, a component carrier having a broadest frequency band, and a component carrier set for monitoring a downlink quality is selected to be the delegate component carrier from among component carriers included in the uplink timing group.

25. The apparatus as claimed in claim 24, wherein the controller performs:
controlling the transceiving unit to receive an uplink timing advance value associated with the uplink timing group through the set delegate component carrier; and
updating the uplink timing group based on the received uplink timing advance value.

26. The apparatus as claimed in claim 19, wherein, when the transceiving unit transmits the message requesting configuration of the uplink timing group to the evolved Node-B, the controller determines whether the user equipment corresponds to one of a case in which a response with respect to uplink transmission data does not exist through a few uplink component carriers of the uplink timing group, a case in which resetting of a downlink synchronization is requested by the evolved Node-B, a case in which an alignment timer set for each component carrier expires, a case in which an alignment timer set by the user equipment expires, a case in which a downlink/uplink connection setup is changed, and a case in which the user equipment performs a handover.

* * * * *